March 29, 1966   J. R. MOOREHEAD   3,242,671
FIXED SPIKE INLET WITH VARIABLE THROAT AND CAPTURE AREA
Filed April 8, 1964   3 Sheets-Sheet 1

INVENTOR.
JAMES R. MOOREHEAD
BY
J. H. Nichols
AGENT

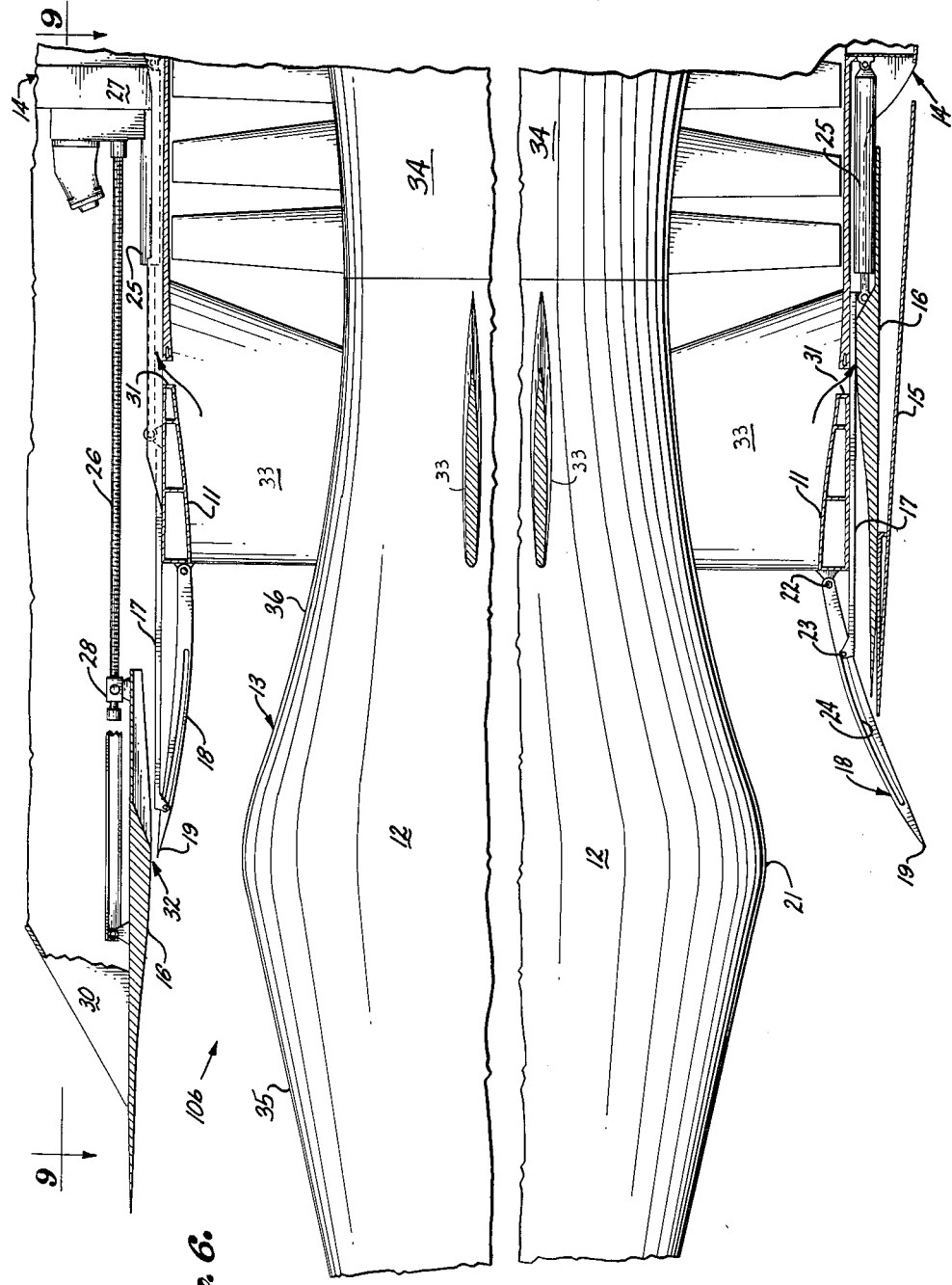

March 29, 1966    J. R. MOOREHEAD    3,242,671
FIXED SPIKE INLET WITH VARIABLE THROAT AND CAPTURE AREA
Filed April 8, 1964    3 Sheets-Sheet 3

INVENTOR.
JAMES R. MOOREHEAD
BY
J. H. Nichols
AGENT

United States Patent Office 3,242,671
Patented Mar. 29, 1966

3,242,671
FIXED SPIKE INLET WITH VARIABLE THROAT AND CAPTURE AREA
James R. Moorehead, Bellevue, Wash., assignor to The Boeing Company, Seattle, Wash., a corporation of Delaware
Filed Apr. 8, 1964, Ser. No. 358,231
11 Claims. (Cl. 60—35.6)

This invention pertains to a fixed spike inlet having a variable throat and capture area.

More specifically this invention relates to an inlet including supersonic and subsonic diffusers, the inlet including a fixed spike and a variable throat and capture area with petals and a translating cowl or lip, the throat being variable through four regimes of static condition or take-offs and landings, subsonic speed, transonic speed, and supersonic or faster speed.

A primary object of this invention is to provide a fixed spike inlet with a variable throat and movable cowl wall for being adjustable to the positions of maximum efficiency at take-off, subsonic speed, transonic speed, and at supersonic or faster speed.

Another object of this invention is to provide an air inlet having a variable capture area controlled by translation of the cowl instead of the center body or spike.

A further object of this invention is to provide an air inlet movable to a bell-mouth configuration for maximum pressure recovery to an engine in the static condition, movable to a low drag configuration for maximum pressure recovery to the engine at subsonic and transonic speeds, and movable to an increased capture area by translation of a lip at supersonic speed for maximum pressure recovery.

A still further object of this invention is to provide an air inlet having a translating lip for providing a variable capture area and a variable outer throat wall actuatable independently of the lip, the variable throat being easily adjustable for providing for hot day temperature variations.

Other objects and various advantages of the disclosed fixed spike inlet with a variable throat and capture area will be apparent from the following detailed description together with the accompanying drawings, submitted for purposes of illustration only and not intended to define the scope of the invention, reference being had for that purpose to the subjoined claims.

Briefly this invention comprises a fixed spike inlet or variable diffuser such as but not limited to an air inlet for an aircraft requiring a variable throat and capture area to provide maximum pressure recovery to the engine during all four regimes of operation, static condition, subsonic speeds, transonic speed, and supersonic or faster speeds. The disclosed variable throat comprises a translating cowl or lip and hinged petals wherein the petals may be opened to form a bell-mouth static air inlet, the petals may be rotated to a decreased capture area to form a subsonic and a transonic air inlet, and the lip may be translated forwardly to form a supersonic or faster air inlet having maximum pressure recovery at the faster speeds.

The drawings diagrammatically illustrate by way of example, not by way of limitation, two forms of the invention wherein like reference numerals designate corresponding parts in the several views in which:

FIG. 4 is a schematic plan view, with parts shown in section similar to FIG. 1 of a modified air inlet actuated to the static or take-off and landing position;

FIG. 6 is a plan view of the air inlet of FIG. 4 actuated to the supersonic or faster speeds position, similar to FIG. 3;

The invention disclosed herein is not limited in its application to the details of construction and arrangement of parts shown and described, since the invention is capable of other embodiments and of being practiced or carried out in various other ways. Also it is to be understood that the phraseology or terminology employed herein is for the purpose of description and not of limitation.

Figure 1:
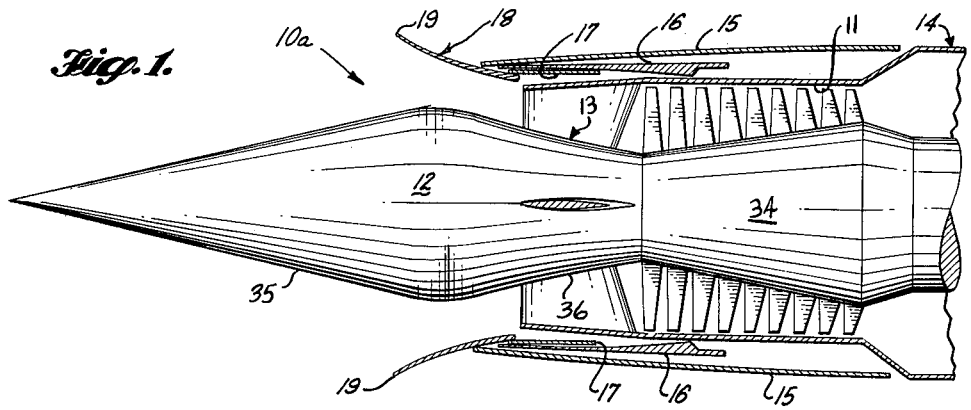
FIG. 1 is a schematic plan view, with parts shown in section, of the air inlet actuated to the static or take-off and landing position.
Figure 2:
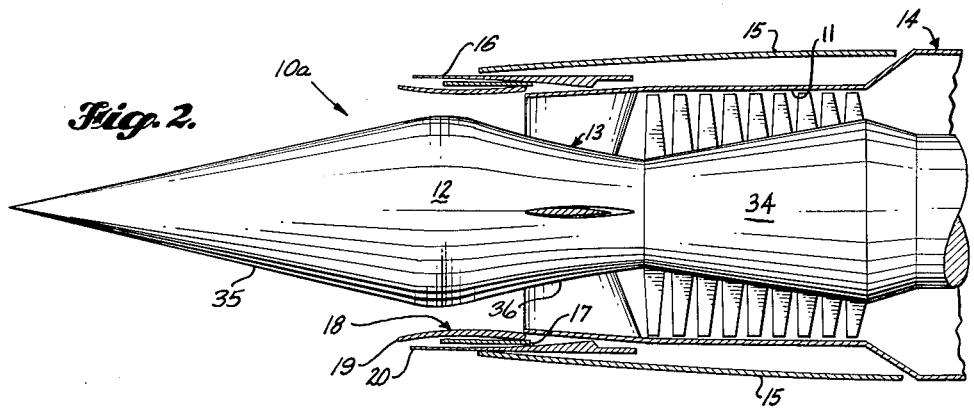
FIG. 2 is a schematic plan view of the air inlet of FIG. 1 actuated to the subsonic and transonic speeds position.
Figure 3:
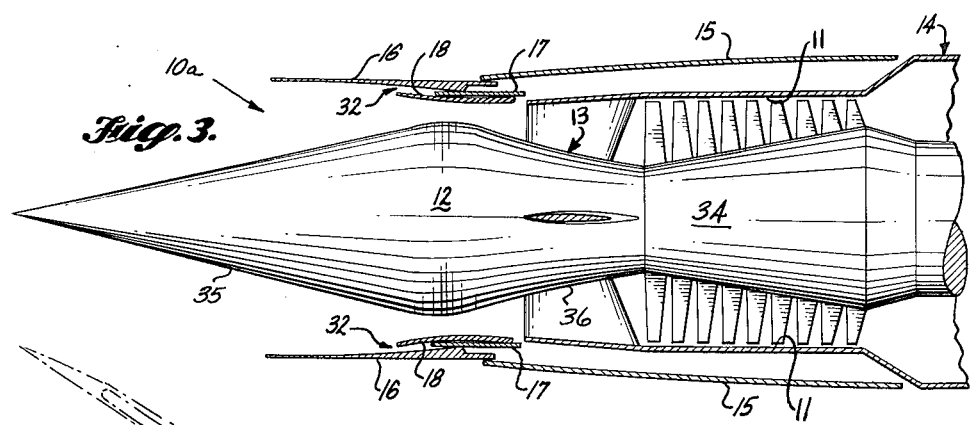
FIG. 3 is a schematic plan view of the air inlet of FIG. 1 actuated to the supersonic or faster speeds position.
Figure 11:
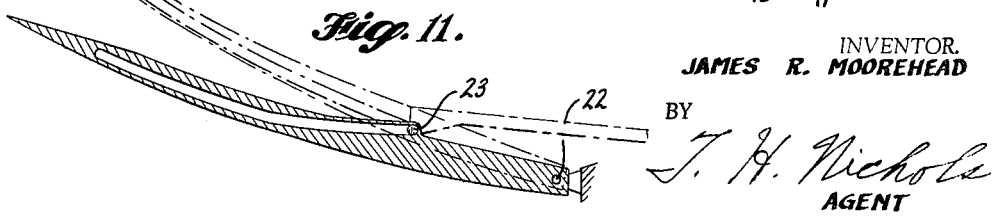
FIG. 11 is a detailed view, with parts shown in section, of the top center petal under the engine support strut.

FIGS. 1, 2, and 3 disclose one embodiment of the variable throat fixed centerbody or spike inlet 10a showing it in the three positions for the four speed ranges, FIG. 1 static through take-off and landing speeds as zero to Mach .2 speeds, FIG. 2 subsonic speeds as Mach .2 to Mach .9, and transonic speeds as Mach .9 to Mach 1.3 speeds, and FIG. 3 supersonic and faster speeds as Mach 1.3 to Mach 4 speeds, and faster on air breathing engines and/or ramjets.

For clarity of disclosure, FIGS. 1, 2, and 3 show only the relative positions of the principal parts of the inlet 10a. While not shown here, the conventional actuators for the moving parts of this embodiment are similar to those disclosed in the embodiment of inlet 10b shown in FIGS. 4, 5, and 6.

Figure 5:
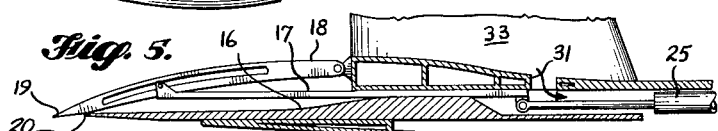
FIG. 5 is a plan view of the air inlet of FIG. 4 actuated to the subsonic and transonic speeds position, with parts removed, similar to FIG. 2.

Except for differences in relative positions, the various parts of inlet 10a, FIGS. 1–3, are substantially the same as the corresponding parts of inlet 10b, FIGS. 4–6, wherein the parts are shown in greater detail. Only the relative positioning of some parts of inlet 10b are changed as is shown hereinafter.

The inlet 10a, FIG. 1, comprises an annular duct outer wall 11 circumscribing the inner portion of a spike 12 having an outer surface 13 forming the duct inner wall, both the outer wall and spike being fixedly mounted to aircraft structure 14 and an air consuming engine 34. A fixed annular cowl 15 is mounted on the aircraft circumferentially of the duct outer wall 11. As illustrated in the FIGS. 1, 2, and 3, a translating lip 16, a translating ring 17, and a hinged petal 18 are operably mounted to aircraft structure between the plane of the duct outer wall 11 and the fixed cowl 15, particularly as shown in detail in FIGS. 4, 5, and 6.

FIG. 1 illustrates the air inlet 10a in its static or take-off and landing position wherein particularly as illustrated in FIG. 4, the petals 18 having leading edges 19 are pivotable outwardly and radially away from the spike 12, or expanded, to form a bell-mouth for maximum capture area. Here the petals are shown having been actuated to the substantially fully outward or expanded position by the aft movement of the translating ring 17 as shown in detail in FIG. 4. The translating lip 16 is also in retracted or aft position.

The front portion of the spike 12 diverges rearwardly, it having a conical shape surface 35 to form a supersonic diffuser with the petals 18 and/or the translating lip 16. Aft of the spike rearward diverging conical portion 35, the surface 13 converges rearwardly to form a frustum 36 of a cone and a subsonic diffuser with the petals 18 and the annular duct wall 11.

The principal distinction between the two modifications disclosed is that the various component parts of the variable throat fixed spike inlet 10a are so positioned in the modification of FIGS. 1-3 that the petal leading edges 19 are positioned forward of the inlet throat, as illustrated, by a distance of at least one third the length of a petal.

FIG. 2 illustrates the air inlet 10a in its subsonic and transonic speeds position wherein the petals 18 have been retracted or actuated inwardly to a contracted or streamlined position substantially parallel to the inlet longitudinal axis by forward movement of the translating ring 17, all elements being illustrated in greater detail in FIG. 4. The duct air entrance formed between the petal lips 19 and the spike 12 provides minimum drag and is thus reduced to a size to receive the required amount of air at transonic velocity to properly supply the aircraft power plants. The translating lip 16 is moved forward in this position until its leading edge 20 is adjacent petal leading edge 19 for providing minimum drag between the petals and the translating lip.

FIG. 3 illustrates the air inlet 10a in its supersonic or faster speed position wherein, with the translating ring 17 and petals 18 being maintained in substantially the same position of FIG. 2, the translating lip 16 is actuated to substantially its forwardmost position for increasing the inlet 10b of FIGS. 4, 5, and 6 are the same as those of air consumed as required for supersonic flight.

While the elements of the variable throat fixed spike inlet 10b of FIGS. 4, 5, and 6 are the same as those of inlet 10a of FIGS. 1-3, the relative position of the elements is changed, however. As illustrated in the drawing of FIGS. 4-6, variable throat fixed spike inlet 10b, FIG. 4 comprises the leading edge 19 of the petal 18 being positioned adjacent the inlet throat or transverse of the widest portion 21 of the spike 12.

FIG. 4 further shows the petal 18 pivotally connected with pin 22 to duct outer wall 11. The petal 18 is actuatable about its pivot 22 by the translating ring 17 due to the roller-slot connection therewith, the roller 23 on the ring leading edge being operable in arcuate slot 24 in the petal as the ring is translated fore and aft by a suitable actuator 25.

Four struts 33 are secured between the spike 12 and the duct outer wall 11 as illustrated on FIGS. 4, 5, and 6. In the static or take-off and landing position of FIG. 4, the translating lip and ring, 16 and 17 respectively are fully retracted and the petals 18 are actuated to the substantially fully open position for maximum capture of air.

In FIG. 5 the translating ring 17 is translated forwardly through a portion of its travel to position the petals 18 substantially parallel to the inlet longitudinal axis with the petal leading edge 19 being positioned substantially normal to the spike widest portion 21 for consumption of the proper amount of air at the particular speed being flown. Simultaneously with inward movement of the petals, the translating lip 16 is translated forwardly until its leading edge 20 is in juxtaposition with the petal leading edges 19 for streamlining and for reducing the aerodynamic drag of the petals to a minimum.

At all times when flying in the range substantially from Mach .2 to Mach 1.3 with the inlets in the position illustrated in FIGS. 2 and 5, vernier adjustments are made to the petals 18 by the translating ring 17 and its actuator 25 to prevent or obviate starvation of the engine while providing minimum drag of the spilled excess air.

FIG. 6 discloses the fixed spike inlet in supersonic or faster speeds position wherein the petals 18 are pivoted inwardly slightly with full forward translation of the ring 17 by actuator motor 25. Simultaneously, the translating lip 16 is actuated to its forward most position for providing increased inlet air capture area.

Any suitable drive means such as but not limited to the disclosed revolving worm 26, and variable worm gear drive motor means 27 may be utilized for operating the traveling nut 28 for translating lip 16 through the three positions of FIGS. 4, 5, and 6. Vernier adjustments of the translating lip location are provided by the motor 27.

Likewise, a suitable conventional sequencing swtich mechanism operable by the pilot may be incorporated in the inlet for controlling the motors 25 and 27 for proper positioning of the petals and the translating lip, respectively, in the positions illustrated in FIGS. 1, 2, and 3, or FIGS. 4, 5, and 6.

Figure 7:
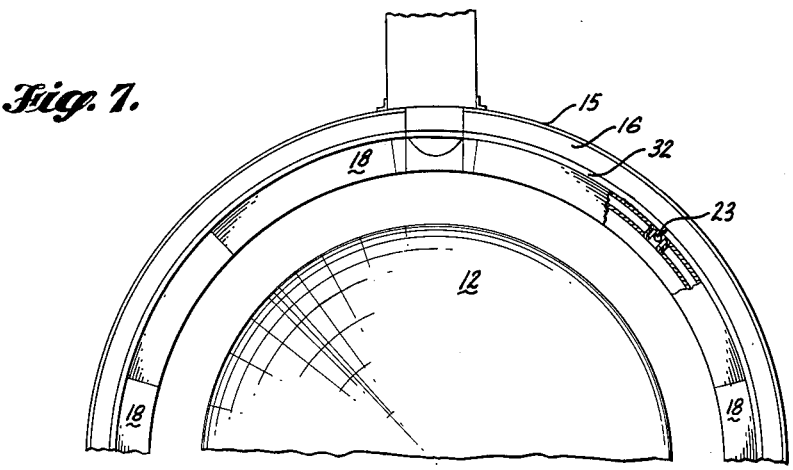
FIG. 7 is a schematic front view of a portion of the air inlet of FIGS. 3 and/or 6 in supersonic speed position.

FIG. 7 illustrates the front view of both embodiments of the air inlet in supersonic position. A cutaway of the petal 18 shows the pivotal connection 23 between the petal and the translating ring 17.

Figure 8:
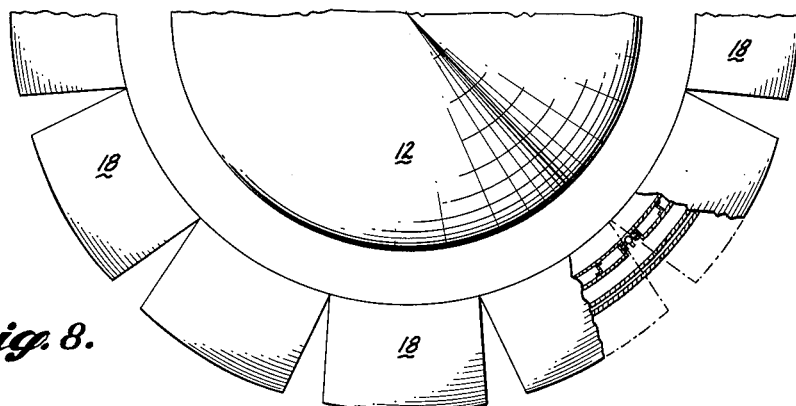
FIG. 8 is a view similar to FIG. 7 but with the petals shown open for maximum capture area at static condition, take-off, or landing conditions.

FIG. 8 discloses the air inlet of FIG. 7 moved to the static or take-off and landing position wherein the petals are opened wide for maximum air consumption.

Figure 9:
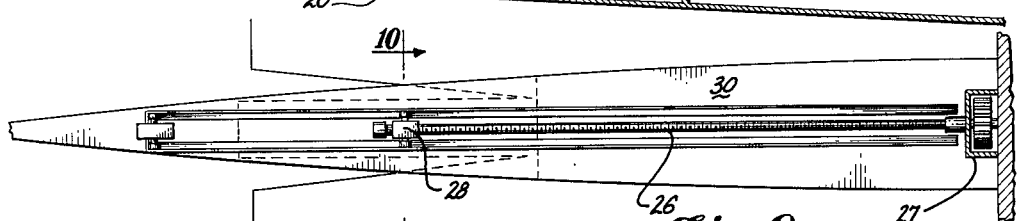
FIG. 9 is a detailed view with parts shown in section, of the translating cowl or lip actuating mechanism taken at 9—9 on FIG. 6.

FIG. 9 is a detailed view taken at 9—9 on FIG. 6 of the mechanism for actuating the translating lip 16, the lip being deleted in this figure. Irreversible motor 27 drives worm traveling nut 28.

Figure 10:
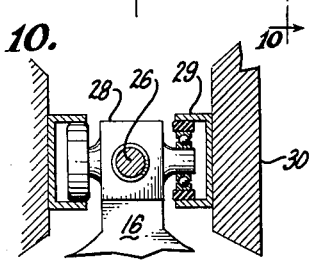
FIG. 10 is a detailed view, with parts shown in section, of the translating cowl or lip supporting track taken at 10—10 on FIG. 9.

FIG. 10, a sectional view taken at 10—10 on FIG. 9, illustrates the traveling nut 28 on the revolving worm 26 for actuating the translating lip 16 fore and aft through the three basic positions shown in FIGS. 1, 2, and 3. Tracks 29 which guide and support the traveling nut 28 are connected to the engine support strut 30.

An air bleed passage 31, FIGS. 4, 5, and 6 is formed in the duct outer wall 11 for dumping air overboard from internally of the inlet during supersonic or faster flight speeds. The air bleed passage 31 is open only while the inlet is in the supersonic position, FIG. 6, and is closed by the contiguous translating ring 17 when the inlet is in its transonic position, FIG. 5, and in its static position, FIG. 4, for maximum pressure recovery.

Another air bleed passage 32, illustrated in FIG. 3, and best shown of FIG. 6 is formed between the translating lip 16 and the leading edge 19 of the petals 18 at the throat of the inlet, wherein the passage and the amount of air expelled may be varied independently of the translating lip by vernier adjustment of the position of the petals leading edges 19 by actuation of the translating ring 17 by its motor 25. This variable by-pass passage 32 (1) expells excess air from the inlet over and above that required by the engine, (2) controls the position of the terminal shock by maintaining it in the throat for maximum pressure recovery, and (3) provides hot day temperature variations as required.

Therefore, the variable throat outer wall provides the proper air flow to the engine during operations from static conditions through maximum flight speeds.

While the petals 18 are illustrated in the limiting or end positions in FIGS. 4 and 6, respectively, vernier adjustment thereof provides a variation, such as but not limited to 1%–2% air flow to the engine for hot day operation, etc. The throat is therefore variable independently of the variable capture area provided by the translating lip.

Another feature of this invention is that when slowing down to transonic speed, and to subsonic speed, the retraction of the translating lip 16 prevents spillage of turbulent air or shock wave disturbance from affecting the adjacent air inlet when two engines are podded or mounted close together.

Accordingly, two adjacent round inlets can be utilized closer to each other than before with no detrimental effects. The inlet which is spilling (at cruise or in deceleration) because of a failed engine has its cowl pulled aft or downstream of the adjacent operating inlet.

In summary, a fixed spike inlet having a variable throat formed by a translating lip and pivotal petals has been disclosed. The inlet provides maximum pressure recovery by gaining maximum capture area at static or take-off and landing speeds by opening wide of the petals, maximum pressure recovery at subsonic and transonic speeds by contraction and vernier adjustment of the petals, and maximum pressure recovery at supersonic and faster speeds by forward translation of the lip.

While only two embodiments of the invention have been shown in the accompanying drawings, it will be evident that various other modifications are possible in the arrangement and construction of the disclosed fixed spike inlet or diffuser with a variable throat without departing from the scope of the invention.

I claim:
1. A fixed spike variable diffuser comprising,
 (a) cylindrical wall means,
 (b) spike means having a conical surface fixed coaxially with said cylindrical wall means, and
 (c) said cylindrical wall means having longitudinally adjustable translating lip means and pivotable bell-mouth petal means for forming an annular variable area duct between said cylindrical wall means and said spike means whereby the capture area of said annular duct is variable by longitudinal adjustment of said translating lip means and by pivoting of said petal means.
2. A variable diffuser as recited in claim 1 wherein,
 (a) said translating lip means comprises translatable annular lip means and lip actuatable means,
 (b) said petal means being adjacent said lip means, and said petal means being movable between a retracted position contiguous with said lip means and an extended bell-mouth position,
 (c) said translatable annular lip means being responsive to said lip actuatable means for moving to an aft position relative to said spike and cylindrical wall means and said petal means being movable to said bell-mouth position for maximum pressure recovery during static conditions and take-off and landing speeds,
 (d) said translatable annular lip means being responsive to said lip actuatable means for moving to an intermediate position relative to said spike and cylindrical wall means and said petal means being movable to said retracted position for maximum pressure recovery during subsonic and transonic speeds, and
 (e) said translatable annular lip means being responsive to said lip actuatable means for moving to a forward position relative to said spike and cylindrical wall means for maximum pressure recovery during supersonic and faster speeds.
3. A variable diffuser as recited in claim 1 having,
 (a) means for pivoting said petals for additionally varying the capture area of said annular duct, said petal pivoting means opening said petals for maximum pressure recovery for static conditions, take-offs, and landings, and retracting said petals for faster speeds.
4. A variable diffuser as recited in claim 3 wherein,
 (a) said petal means comprises a plurality of petals pivotally attached to said cylindrical wall means leading edge.
5. A diffuser as recited in claim 3 wherein,
 (a) said cylindrical wall means has a first air bleed passage means for permitting air to flow from said duct, and
 (b) said petal pivoting means has translating ring means, said translating ring means being contiguous with said first air bleed passage means for controlling the air flow from said first passage means for maximum pressure recovery.
6. A diffuser as recited in claim 5 wherein,
 (a) said first passage means is responsive to said translating ring means for being closed when said petals are open and for being opened during supersonic or faster speeds for maximum pressure recovery.
7. A diffuser as recited in claim 3 wherein,
 (a) said translating lip means surrounds said petal means for forming a second air bleed passage means at the throat of said duct, and
 (b) said second air bleed passage means being responsive to said translating lip means for being opened during supersonic or faster speeds for maximum pressure recovery.
8. A fixed spike variable diffuser comprising,
 (a) a cylindrical wall,
 (b) a spike extending coaxially forwardly from within said wall,
 (c) said spike having a conical surface fixed relative to said wall, and
 (d) said cylindrical wall having a translating lip and expandable bell-mouth petals pivotally connected to said wall, said translating lip being longitudinally adjustable relative to said cylindrical wall and said petals being expandable pivotally between a streamlined position and a bell-mouth position for forming a fixed spike annular variable area diffuser between said cylindrical wall and said spike conical surface and
 (e) means for actuating said translating lip and said expandable petals for varying the area of said fixed spike variable area diffuser.
9. A fixed spike air inlet comprising,
 (a) a spike for mounting on the front of an engine,
 (b) an outer wall connected to said spike, said wall having a leading edge and circumscribing said spike for forming an inlet air duct therewith,
 (c) a plurality of petals pivotally attached to said outer wall leading edge and extending forwardly of said wall for forming a variable throat air inlet duct with said spike,
 (d) means for pivoting said petals for providing vernier adjustments of said petals for fine air flow control, through all speeds, said means providing large adjustments for increasing the capture area at static conditions or take-off and landing speeds,
 (e) a translating lip connected to said outer wall, said lip circumscribing said outer wall and being longitudinally adjustable relative to said outer wall,
 (f) actuator means for translating said lip between a position substantially rearward of said petals for permitting outward pivotal movement of said petals and a position substantially forward of said petals for increasing the capture area at supersonic speeds.
10. A variable inlet comprising,
 (a) a conical wall,
 (b) a cylindrical wall fixed relative to said conical wall and having a translating lip and pivotal bell-mouth petal means, and
 (c) said translating lip being longitudinally adjustable relative to said cylindrical wall, said conical wall being positioned coaxial with said translating lip and said pivotal bell-mouth petal means for forming an annular variable area duct therebetween whereby the area of said annular duct is variable by longitudinal adjustment of said translating lip and by pivoting of said petal means.

11. A variable diffuser as recited in claim 3 wherein,
(a) said petal pivoting means has means for making vernier adjustments to the petals for improved airflow through said variable diffuser.

References Cited by the Examiner

UNITED STATES PATENTS

| 2,877,965 | 3/1959 | Wakefield | 60—35.6 |
| 2,931,167 | 4/1960 | Leduc | 60—35.6 |
| 3,069,842 | 12/1962 | Price | 60—35.6 |

MARK NEWMAN, *Primary Examiner.*

RALPH D. BLAKESLEE, *Examiner.*